(12) United States Patent
Fukuhara et al.

(10) Patent No.: US 8,202,448 B2
(45) Date of Patent: Jun. 19, 2012

(54) LIQUID-CRYSTALLINE POLYESTER RESIN COMPOSITION AND CONNECTOR USING THE SAME

(75) Inventors: Yoshiyuki Fukuhara, Tsuchiura (JP); Hiroyasu Yamauchi, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 72 days.

(21) Appl. No.: 12/646,380

(22) Filed: Dec. 23, 2009

(65) Prior Publication Data

US 2010/0163796 A1 Jul. 1, 2010

(30) Foreign Application Priority Data

Dec. 25, 2008 (JP) ................. 2008-331141

(51) Int. Cl.
C09K 19/38 (2006.01)
C09K 19/34 (2006.01)
C09K 19/20 (2006.01)
C08K 3/34 (2006.01)
C08G 63/60 (2006.01)
C08L 67/04 (2006.01)

(52) U.S. Cl. ......... 252/299.66; 252/299.01; 252/299.67; 252/299.61; 524/449; 524/559

(58) Field of Classification Search .............. 252/299.01, 252/299.66, 299.67, 299.5; 524/449, 599
See application file for complete search history.

(56) References Cited

U.S. PATENT DOCUMENTS

| 6,680,002 B2 * | 1/2004 | Yamauchi et al. ....... 252/299.01 |
| 2003/0168634 A1 | 9/2003 | Yamauchi et al. |
| 2006/0025561 A1 | 2/2006 | Watanabe et al. |
| 2010/0073807 A1 * | 3/2010 | Kosugi ............................ 360/76 |
| 2010/0230637 A1 * | 9/2010 | Iwase et al. ................ 252/299.6 |

FOREIGN PATENT DOCUMENTS

| JP | 2003-109700 A | 4/2003 |
| JP | 2009-108179 A | 5/2009 |
| JP | 2009-108180 A | 5/2009 |

OTHER PUBLICATIONS

English translation by computer for JP 2003-109700, http://www4.ipdl.inpit.go.jp/Tokujitu/PAJdetail.ipdl?N0000=60&N0120=01&N2001=2&N3001=2003-109700.*

* cited by examiner

Primary Examiner — Shean Wu
(74) Attorney, Agent, or Firm — Panitch Schwarze Belisario & Nadel LLP

(57) ABSTRACT

A liquid-crystalline polyester resin composition is provided including a liquid-crystalline polyester obtained by polymerizing monomers of an aromatic hydroxycarboxylic acid in the presence of an imidazole compound. The composition also includes a mica which is a muscovite and has a volume average particle diameter of 40 μm or less and a specific surface area of 6 $m^2/g$ or less, the amount of the mica being 15 to 100 parts by weight based on 100 parts by weight of the liquid-crystalline polyester. The liquid-crystalline polyester resin composition has melt fluidity sufficient to be molded into a connector having an ultra-thin wall thickness portion. The resulting connector has sufficiently suppressed warp and sufficient soldering resistance.

13 Claims, 1 Drawing Sheet

LIQUID-CRYSTALLINE POLYESTER RESIN COMPOSITION AND CONNECTOR USING THE SAME

BACKGROUND OF THE INVENTION

1. Field of the Invention

The present invention relates to a liquid-crystalline polyester resin composition which is useful as a molding material for production of electronic components, and an electronic component using the same, particularly a connector.

2. Description of the Related Art

A liquid-crystalline polyester has excellent melt fluidity and is therefore used as a molding material for the production of electronic components such as a molded article having a thin-wall portion, particularly an electronic component such as a connector having a thin-wall portion and a complicated shape. In order to improve characteristics such as mechanical strength of the electronic components, various studies have been made on a liquid-crystalline polyester resin composition which contains a liquid-crystalline polyester, a fibrous filler (glass fiber, etc.) and a platy filler (talc, etc.), as a molding material for the electronic components.

With the progress of surface mount technology relating to formation of terminals of electronic components and also with the trend of light, thin, short and small mobile devices using electronic components, thinner and more complicated-shaped electronic components has recently been required. A demand for thinning of a connector, particularly an elongated connector among the electronic components has increased. However, when an elongated connector having a very thin portion or an elongated connector having a small size is produced, the connecter tends to have warp in a longitudinal direction of the resultant connector. In order to obtain a connector having suppressed warp, for example, Japanese Unexamined Patent Publication (Kokai) No. (JP-A-) 2003-109700 proposes a resin composition which contains fillers and a liquid-crystalline polyester produced in the presence of an imidazole compound as a catalyst, as a molding material for providing such a connector.

The resin composition disclosed in JP-A-2003-109700 has melt fluidity sufficient to be molded into a connector having a complicated shape, and thus a connector with less warp can be obtained by molding of the resin composition. However, in the production of a connector having a more complicated shape as a result of further thinning, it is required that a molding material has more satisfactory melt fluidity and the occurrence of warp is further suppressed in the resultant connector. It is also required to further improve heat resistance (such as soldering resistance) to a soldering treatment in a surface mount process of the resultant connector.

SUMMARY OF THE INVENTION

One of objectives of the present invention is to provide a liquid-crystalline polyester resin composition which has melt fluidity sufficient to be molded into a connector having a ultra-thin wall thickness portion having a wall thickness of 0.1 mm or less, and which can provide a connector with sufficiently suppressed warp as well as sufficient soldering resistance by molding of the resin composition. Another objective the present invention is to provide a connector having sufficiently suppressed warp using the liquid-crystalline polyester resin composition.

Namely, the present invention is provide a liquid-crystalline polyester resin composition comprising a liquid-crystalline polyester obtained by polymerizing monomers comprising an aromatic hydroxycarboxylic acid in the presence of an imidazole compound, and a mica which comprises muscovite and has a volume average particle diameter of 40 μm or less and a specific surface area of 6 m$^2$/g or less, the amount of the mica being 15 to 100 parts by weight based on 100 parts by weight of the liquid-crystalline polyester.

The present invention also provides a method for producing the above-described liquid-crystalline polyester resin composition, and further provides a connector obtained by molding the liquid-crystalline polyester resin composition.

The liquid-crystalline polyester resin composition of the present invention can be molded into electronic components such as a connector, which have sufficient soldering resistance and sufficiently suppressed warp. The liquid-crystalline polyester resin composition of the present invention has melt fluidity sufficient to be molded into a connector which has an ultra-thin portion and/or has a complicated shape. Therefore, the liquid-crystalline polyester resin composition of the present invention is particularly useful as a molding material for production of components wherein thinning and complexity of the shape will advance more and more in future, and the industrial value is very great.

Figure 1:
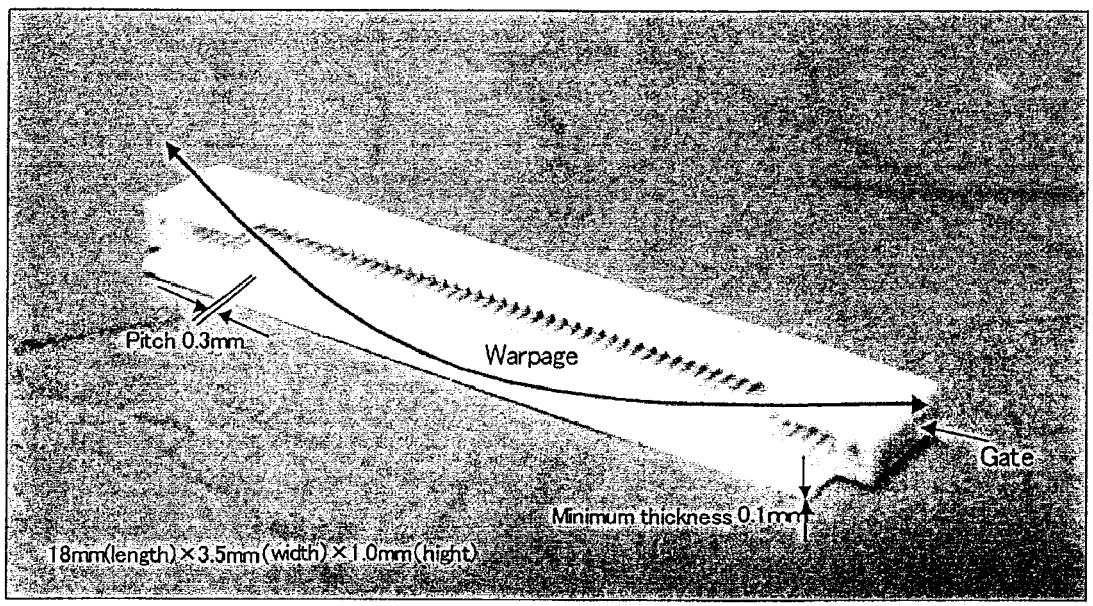
FIG. 1 is a photograph showing a perspective appearance of a connector used for evaluation of an amount of warp of Examples.

PREFERRED EMBODIMENTS OF THE INVENTION a liquid-crystalline polyester resin composition of the present invention comprises a liquid-crystalline polyester obtained and a mica. The liquid-crystalline polyester and the mica used in the present invention, a method for producing the liquid-crystalline polyester resin composition, and electronic components such as a connector obtained by molding the liquid-crystalline polyester resin composition are sequentially explained below.

The liquid-crystalline polyester used in the present invention is polyester referred to as a thermotropic liquid crystal polyester and has a feature in which an anisotropic melt is formed at a temperature of 400° C. or lower. The liquid-crystalline polyester used in the present invention is obtained by polymerizing monomers in the presence of an imidazole compound, the monomers comprising an aromatic hydroxycarboxylic acid. The monomers may be composed of one kind of monomer (that is, an aromatic hydroxycarboxylic acid, only) or may contain two or more kinds of monomers in which an aromatic hydroxycarboxylic acid is contained. Examples of the liquid-crystalline polyester obtained using monomers comprising the aromatic hydroxycarboxylic acid include Liquid-crystalline polyesters (P1) to (P3) shown below:

(P1) Liquid-crystalline polyester obtained using a combination of an aromatic hydroxycarboxylic acid, an aromatic dicarboxylic acid and an aromatic diol as raw monomers and polymerizing the monomers;

(P2) Liquid-crystalline polyester obtained using different kinds of aromatic hydroxycarboxylic acids as raw monomers and polymerizing the monomers; and (P3) Liquid-crystalline polyester obtained by reacting a crystalline polyester (such as polyethylene terephthalate) with an aromatic hydroxycarboxylic acid.

Among these, (P1), namely, a liquid-crystalline polyester obtained using a combination of an aromatic hydroxycarboxylic acid, an aromatic dicarboxylic acid and an aromatic diol as raw monomers for polymerization is preferred. In the production of the liquid-crystalline polyester, a part or all of the aromatic hydroxycarboxylic acid, the aromatic dicarboxylic acid and the aromatic diol to be used as the raw monomers is/are preferably used for polymerization after being converted into an ester-forming derivative(s) corresponding thereto in advance in view of easier production.

Examples of the ester-forming derivative of the aromatic hydroxycarboxylic acid and the aromatic dicarboxylic acid having a carboxyl group in the molecule include those in which the carboxyl group has been converted into a highly reactive group such as a haloformyl group or an acyloxycarbonyl group, and those in which an ester is formed with alcohols or ethylene glycol so that the carboxyl group forms a polyester by the transesterification reaction.

Examples of the ester-forming derivative of the aromatic hydroxycarboxylic acid and aromatic diol having a phenolic hydroxyl group in the molecule include those in which the phenolic hydroxyl group and lower carboxylic acids form an ester so that the phenolic hydroxyl group forms a polyester by the transesterification reaction.

Among the examples of the ester-forming derivatives as the monomers of the liquid-crystalline polyester (P1), it is preferably use to an ester-forming derivative in which the phenolic hydroxyl group and lower carboxylic acids form an ester, namely, an acylated compound obtained by acylating an aromatic hydroxycarboxylic acid and an aromatic diol.

Structural units constituting the liquid-crystalline polyester (P1) will be explained by way of examples described below.

Examples of the aromatic hydroxycarboxylic acid include parahydroxybenzoic acid (an aromatic hydroxycarboxylic acid from which $(A_1)$ described hereinafter is derived), metahydroxybenzoic acid, 2-hydroxy-6-naphthoic acid (an aromatic hydroxycarboxylic acid from which $(A_2)$ described hereinafter is derived), 2-hydroxy-3-naphthoic acid, 1-hydroxy-5-naphthoic acid, 4-hydroxy-4'-carboxydiphenyl ether, and an aromatic hydroxycarboxylic acid in which a portion of hydrogen atoms in the aromatic ring of these aromatic hydroxycarboxylic acids are substituted with a substituent selected from the group consisting of an alkyl group, an aryl group and a halogen atom. In the production of the liquid-crystalline polyester, the aromatic hydroxycarboxylic acids may be used alone, or two or more kinds of them may be used in combination.

Examples of the structural unit derived from the aromatic hydroxycarboxylic acid include the following structural units:

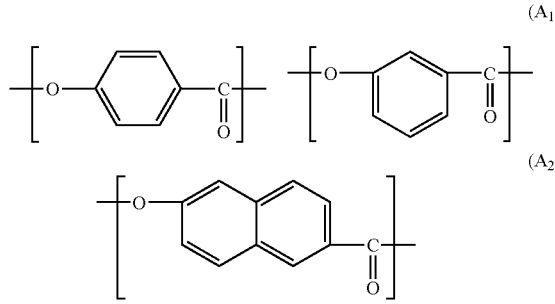

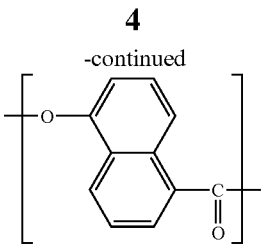

Regarding the structural units, a portion of hydrogen atoms in the aromatic ring may be substituted with a substituent selected from the group consisting of a halogen atom, an alkyl group and an aryl group.

Examples of the aromatic dicarboxylic acid include, for example, terephthalic acid (an aromatic dicarboxylic acid from which $(B_1)$ described hereinafter is derived), isophthalic acid (an aromatic dicarboxylic acid from which $(B_2)$ described hereinafter is derived), biphenyl-4,4'-dicarboxylic acid, 2,6-naphthalenedicarboxylic acid (an aromatic dicarboxylic acid from which $(B_3)$ described hereinafter is derived), diphenylether-4,4'-dicarboxylic acid, diphenylthioether-4,4'-dicarboxylic acid, and an aromatic dicarboxylic acid in which a portion of hydrogen atoms in the aromatic ring of these aromatic dicarboxylic acids are substituted with a substituent selected from the group consisting of an alkyl group, an aryl group and a halogen atom. In the production of the liquid-crystalline polyester, the aromatic dicarboxylic acids may be used alone, or two or more kinds of them may be used in combination.

Examples of the structural unit derived from the aromatic dicarboxylic acid include the following structural units.

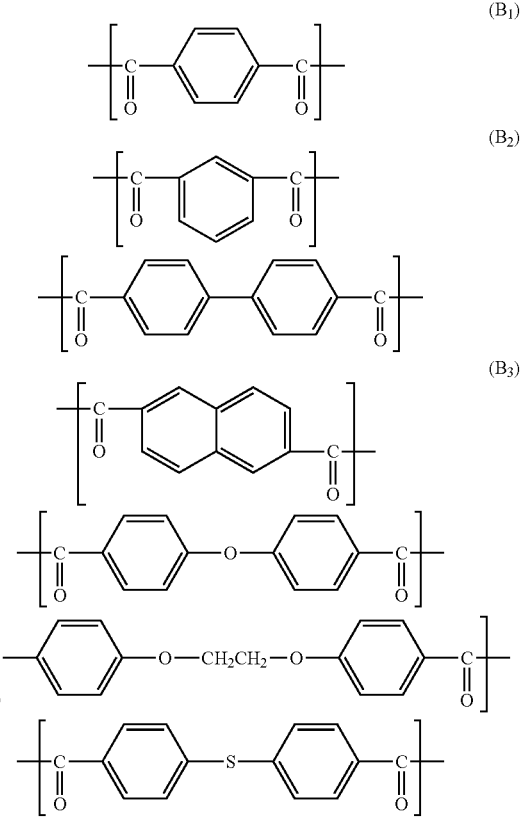

Regarding the structural units, a portion of hydrogen atoms in the aromatic ring may be substituted with a substituent selected from the group consisting of a halogen atom, an alkyl group and an aryl group.

Examples of the aromatic diol include, for example, 4,4'-dihydroxybiphenyl (an aromatic diol from which ($C_1$) described hereinafter is derived), hydroquinone (an aromatic diol from which ($C_2$) described hereinafter is derived), resorcin (an aromatic diol from which ($C_3$) described hereinafter is derived), 4,4'-dihydroxydiphenyl ketone, 4,4'-dihydroxydiphenyl ether, bis(4-hydroxyphenyl)methane, 1,2-bis(4-hydroxyphenyl)ethane, 4,4'-dihydroxydiphenyl sulfone, 4,4'-dihydroxydiphenyl thioether, 2,6-dihydroxynaphthalene, 1,5-dihydroxynaphthalene, and an aromatic diol in which a portion of hydrogen atoms in the aromatic ring of these aromatic diols are substituted with a substituent selected from the group consisting of an alkyl group, an aryl group and a halogen atom. In the production of the liquid-crystalline polyester, the aromatic diols may be used alone, or two or more kinds of them may be used in combination.

Examples of the structural unit derived from the aromatic diol include the following structural units:

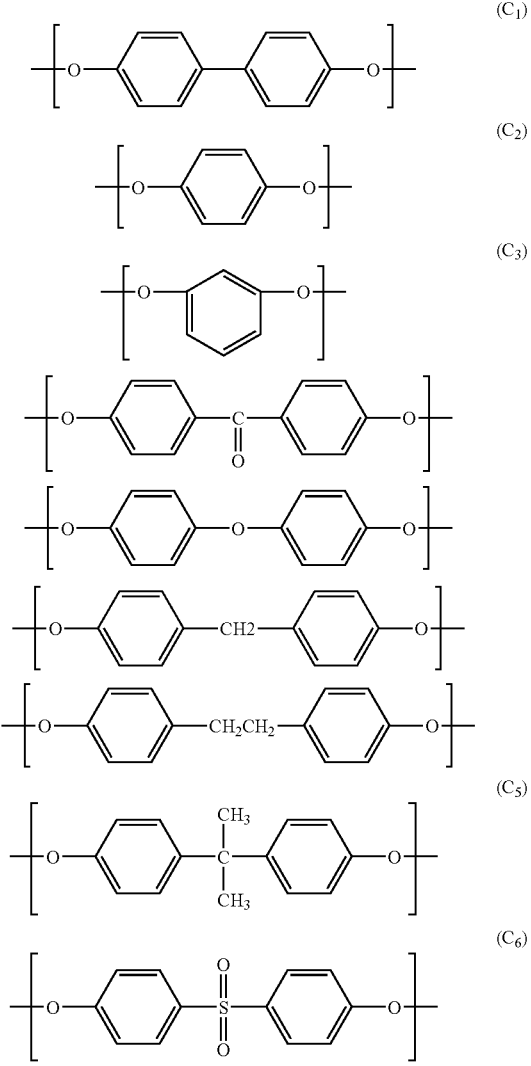

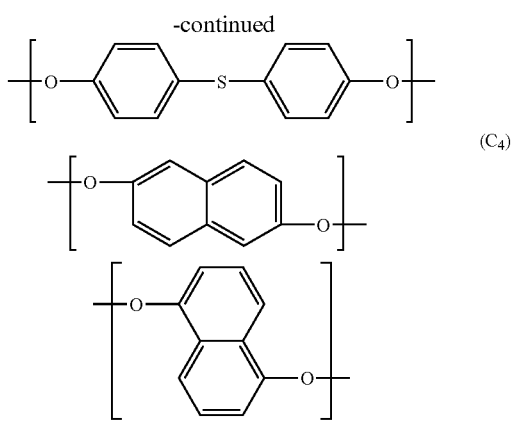

Regarding the structural units, a portion of hydrogen atoms in the aromatic ring may be substituted with a substituent selected from the group consisting of a halogen atom, an alkyl group and an aryl group.

Among the Examples of the substituents which may be optionally included in the structural units, examples of the halogen atom include a fluorine atom, a chlorine atom and a bromine atom; examples of the alkyl group include lower alkyl groups having about 1 to 4 carbon atoms, such as a methyl group, an ethyl group and a butyl group; and examples of the aryl group include a phenyl group.

When a molded article (electronic components) particularly with satisfactory heat resistance (soldering resistance) is required, it is better to use a liquid-crystalline resin composition of the present invention provided by polymerizing the monomers with the smaller number of these substituents. It is particularly preferred to use a liquid-crystalline resin composition provided by polymerizing the monomers having no such a substituent as an alkyl group.

With respect to structural units in the monomers for the liquid-crystalline polyester which is particularly preferred for application in the present invention, among (P1) described above, a combination of the structural units will be described in detail based on the above structural unit.

The liquid-crystalline polyester preferably has the structural unit ($A_1$) as the structural unit derived from the aromatic hydroxycarboxylic acid, and preferably has the structural unit ($A_1$) in an amount of 30 mol % or more based on the total amount of all structural units. With respect to structural units in the monomers for the preferred liquid-crystalline polyester having the structural unit ($A_1$), examples of a combination of the structural units include Combinations (a) to (h) shown below:

(a) Combination of ($A_1$), ($B_1$) and ($C_1$);
(b) Combination of ($A_1$), ($B_1$), ($B_2$) and ($C_1$);
(c) Combination of ($A_1$), ($A_2$), ($B_1$) and ($C_1$);
(d) Combination of ($A_1$), ($A_2$), ($B_1$), ($B_2$) and ($C_1$);
(e) Combination of ($A_1$), ($B_1$), ($B_3$) and ($C_1$);
(f) Combination of ($A_1$), ($B_1$), ($B_2$), ($B_3$) and ($C_1$);
(g) Combination of ($A_1$), ($B_1$), ($C_1$) and ($C_3$); and
(h) Combination of ($A_1$), ($B_1$), ($B_2$), ($C_1$) and ($C_3$).

Among these combinations, the Combinations (a) and (b) are preferred, and the Combination (a) is more preferred. Regarding the Combination (a), a molar ratio of ($C_1$) to ($A_1$) (that is, a molar ratio ($C_1$)/($A_1$)) is preferably in a range of from 0.2 to 1, a molar ratio of the total of ($B_1$) and ($B_2$) to ($C_1$) (that is, a molar ratio (($B_1$)+($B_2$))/($C_1$)) is preferably in a range of from 0.9 to 1.1, and a molar ratio of ($B_2$) to ($B_1$) (that is, a molar ratio ($B_2$)/($B_1$)) is preferably more than 0 but 1 or less. The liquid-crystalline polyester obtained by polymerizing, in the presence of an imidazole compound, the raw monomers satisfying the combination of the above-described structural units and satisfying the above-described molar ratio can has more satisfactory melt fluidity and can be made into a molding article having excellent impact resistance.

As described above, the liquid-crystalline polyester resin composition used in the present invention is obtained by polymerizing raw monomers comprising an aromatic hydroxycarboxylic acid in the presence of an imidazole compound, and such a liquid-crystalline is preferably obtained by a method comprising the steps of:

acylating a phenolic hydroxyl group of the aromatic hydroxycarboxylic acid and a phenolic hydroxyl group of the aromatic diol with a fatty acid anhydride to obtain an acylated aromatic hydroxycarboxylic acid and an acylated aromatic diol; and polymerizing the acylated aromatic hydroxycarboxylic acid, an aromatic dicarboxylic acid and the acylated aromatic diol in the presence of an imidazole compound through transesterification to obtain a liquid-crystalline polyester.

In the preferable production method, the imidazole compound exists in the polymerization step. In addition, the imidazole compound may exist in the acylation step. Preferably, the imidazole compound exists in both of the acylation step and the polymerization step.

Preferred production methods for the liquid-crystalline polyesters used in the present invention will be described in more detail below. First, the acylation step of acylating a phenolic hydroxyl group of the aromatic hydroxycarboxylic acid and a phenolic hydroxyl group of the aromatic diol with a fatty acid anhydride to obtain an acylated aromatic dicarboxylic acid and an acylated aromatic diol will be explained.

Examples of the fatty acid anhydride include acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride and β-bromopropionoic anhydride. Two or more kinds of these fatty acid anhydrides may be used in combination. In view of cost and handling properties, acetic anhydride, propionic anhydride, butyric anhydride and isobutyric anhydride are preferred, and acetic anhydride is more preferred.

The amount of the fatty acid anhydride used is preferably in a range of from 1 to 1.2 mol, more preferably in a range of from 1 to 1.15 mol, further more preferably in a range of from 1.03 to 1.12 mol, and most preferably in a range of from 1.05 to 1.1 mol, based on 1 mol of the total amount of the phenolic hydroxyl group of the aromatic hydroxycarboxylic acid and the phenolic hydroxyl group of the aromatic diol. When the amount of the fatty acid anhydride is too small, the acylation reaction does not easily proceeds and the unreacted aromatic dihydroxycarboxylic acid or aromatic diol is likely to remain in the subsequent polymerization step, and thus the polymerization may not efficiently proceed. If the acylation reaction does not sufficiently proceed, the unacylated raw monomer (aromatic hydroxycarboxylic acid or aromatic diol) may be sometimes sublimated, resulting in clogging of a fractionator used upon polymerization. In contrast, when the amount of the fatty acid anhydride is too large, the resulting liquid-crystalline polyester is likely to be colored.

Regarding the reaction conditions of the acylation, the reaction temperature is preferably in a range of from 130 to 180° C., and the reaction time is preferably in a range of from 30 minutes to 20 hours. The reaction temperature is more preferably in a range of from 140 to 160° C., and the reaction time is more preferably in a range of from 1 to 5 hours.

Next, the polymerization step of the acylated aromatic hydroxycarboxylic acid, the aromatic dicarboxylic acid and the acylated aromatic diol through transesterification to obtain a liquid-crystalline polyester will be explained. In the polymerization step, a transesterification reaction of these monomers is conducted. More specifically, in the polymerization step, (i) an acyl group of the acylated aromatic hydroxycarboxylic acid obtained in the acylation step and/or (ii) an acyl group of the acylated aromatic diol obtained in the acylation step is/are exchanged with (iii) an acyl group corresponding to the residue obtained by removing a hydroxyl group from a carboxyl group of the acylated aromatic hydroxycarboxylic acid obtained in the acylation step and/or (iv) an acyl group corresponding to the residue obtained by removing a hydroxyl group from a carboxyl group of the aromatic dicarboxylic acid, to obtain a liquid-crystalline polyester. The aromatic dicarboxylic acid may be allowed to exist in the reaction system in the course of the acylation step; in other words, in the acylation step, the aromatic hydroxycarboxylic acid, the aromatic dicarboxylic acid and the aromatic diol may be allowed to exit in the same reaction system. This is because the carboxyl group and optionally substituted substituent in the aromatic dicarboxylic acid are not typically influenced by a fatty acid anhydride. Therefore, it is possible to use the procedure of adding the aromatic hydroxycarboxylic acid, the aromatic dicarboxylic acid and the aromatic diol into the same reactor and performing the acylation reaction with a fatty acid anhydride, or the procedure of adding first the aromatic hydroxycarboxylic acid and the aromatic diol into the reactor, acylating them with a fatty acid anhydride and then adding the aromatic diol into the reactor. The former procedure is preferred in view of operational convenience.

The polymerization step is preferably performed while raising the reaction temperature and, specifically, the polymerization step is preferably performed while raising a temperature within a range of from 130 to 400° C. at a rate of from 0.1 to 50° C./minute, and more preferably performed while raising a temperature within a range of from 150 to 350° C. at a rate of from 0.3 to 5° C./minute.

Furthermore, in order to shift equilibrium of the transesterification reaction in the polymerization step, fatty acid(s) produced as by-product(s) and the unreacted fatty acid anhydride are preferably vaporized and distilled out of the reaction system through a fractionator or the like. It is also possible to condense or reverse-sublimate a portion of raw monomers vaporized or sublimated together with fatty acid(s) by refluxing a portion of the distilled fatty acid(s), and thus the monomers can be returned to the reactor.

As described previously, the liquid-crystalline ester can be suitably obtained by allowing an imidazole compound to exist in the polymerization step, more preferably in the acylation step and the polymerization step. The imidazole compound is preferably a compound represented by the following formula (1):

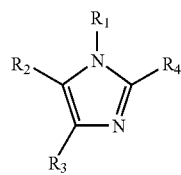

(1)

wherein $R_1$ to $R_4$ each represent a hydrogen atom, an alkyl group having 1 to 4 carbon atoms, a hydroxymethyl group, a cyano group, a cyanoalkyl group having 2 to 5 carbon atoms, a cyanoalkoxy group having 2 to 5 carbon atoms, a carboxyl group, an amino group, an aminoalkyl group having 1 to 4 carbon atoms, an aminoalkoxyl group having 1 to 4 carbon atoms, a phenyl group, a benzyl group, a phenylpropyl group or a formyl group, and may be the same or different from one another.

Specific examples of the imidazole compound include imidazole, 1-methylimidazole, 2-methylimidazole, 4-methylimidazole, 1-ethylimidazole, 2-ethylimidazole, 4-ethylimidazole, 1,2-dimethylimidazole, 1,4-dimethylimidazole, 2,4-dimethylimidazole, 1-methyl-2-ethylimidazole, 1-methyl-4-ethylimidazole, 1-ethyl-2-methylimidazole, 1-ethyl-2-ethylimidazole, 1-ethyl-2-phenylimidazole, 2-ethyl-4-methylimidazole, 2-phenylimidazole, 2-undecylimidazole, 2-heptadecylimidazole, 1-benzyl-2-methylimidazole, 2-phenyl-4-methylimidazole, 1-(2-cyanoethyl)-2-methylimidazole, 1-(2-cyanoethyl)-2-phenylimidazole, 4-(2-cyanoethyl)-2-ethyl-4-methylimidazole, 1-(2-aminoethyl)-2-methylimidazole, 1-[2-(2-cyanoethylamino)ethyl]-2-methylimidazole, N-[2-(2-methyl-1-imidazolyl)ethyl]urea, 1-(2-cyanoethyl)-2-undecylimidazole, 1-(2-cyanoethyl)-2-methylimidazole trimellitate, 1-(2-cyanoethyl)-2-phenylimidazole trimellitate, 1-(2-cyanoethyl)-2-ethyl-4-methylimidazole trimellitate, 1-(2-cyanoethyl)-2-undecylimidazole trimellitate, 2,4-diamino-6-[2-(2-methyl-1-imidazolyl)ethyl]-S-triazine, 2,4-diamino-6-[2-(2-undecyl-1-imidazolyl)ethyl]-S-triazine, 2,4-diamino-6-[2-(2-ethyl-4-methyl-1-imidazolyl)ethyl]-S-triazine, 1-dodecyl-2-methyl-3-benzylmidazolium chloride, N,N'-bis[2-(2-methyl-1-imidazolyl)ethyl]urea, N,N'-bis[2-(2-methyl-1-imidazolyl)ethyl]adipoamide, 2,4-dialkylimidazole-5-dithiocarboxylic acid, 1,3-dibenzyl-2-methylimidazolium chloride, 2-phenyl-4-methyl-5-hydroxymethylimidazole, 2-phenyl-4,5-bis(hydroxymethyl)imidazole, 1-(2-cyanoethyl)-2-phenyl-4,5-bis(2-cyanoethoxymethyl)imidazole, 2-methylimidazole•isocyanuric acid adduct, 2-phenylimidazole•isocyanuric acid adduct, 2,4-diamino-6-[2-(2-methyl-1-imidazolyl)ethyl]-S-triazine•isocyanuric acid adduct, 2-alkyl-4-formylimidazole, 2,4-dialkyl-5-formylimidazole, 1-benzyl-2-phenylimidazole, imidazole-4-dithiocarboxylic acid, 2-methylimidazole-4-dithiocarboxylic acid, 2-undecylimidazole-4-dithiocarboxylic acid, 2-heptadecylimidazole-4-dithiocarboxylic acid, 2-phenylimidazole-4-dithiocarboxylic acid, 4-methylimidazole-5-dithiocarboxylic acid, 4-dimethylimidazole-5-dithiocarboxylic acid, 2-ethyl-4-methylimidazole-5-dithiocarboxylic acid, 2-undecyl-4-methylimidazole-5-dithiocarboxylic acid, 2-phenyl-4-methylimidazole-5-dithiocarboxylic acid, 1-(2-aminoethyl)-2-methylimidazole, 1-[2-(2-cyanoethyl)aminoethyl]-2-methylimidazole, N-[2-(2-methyl-1-imidazolyl)ethyl]urea, N,N'-bis[2-(2-methyl-1-imidazolyl)ethyl]adipoyldiamide, 1-(2-aminoethyl)-2-ethylimidazole, 4-formylimidazole, 2-methyl-4-formylimidazole, 4-methyl-5-formylimidazole, 2-ethyl-4-methyl-5-formylimidazole and 2-phenyl-4-methyl-5-formylimidazole.

Among these imidazole compounds, an imidazole compound selected from imidazole derivatives represented by the formula (1) in which $R_1$ is an alkyl group having 1 to 4 carbon atoms and $R_2$ to $R_4$ each represents a hydrogen atom is preferred in view of catalysis in the acylation reaction and the transesterification reaction and in view of influence in color tone of a molded article obtained from a resulting liquid-crystalline polyester. When such an imidazole derivative is used, reactivity of the acylation reaction in the acylation step and the transesterification reaction in the polymerization step can be more improved, and also color tone of a molded article (electronic components) obtained using the resulting liquid-crystalline polyester of the present invention is more improved. Among these imidazole derivatives, 1-methylimidazole and 1-ethylimidazole are particularly preferred since they are easily available.

The amount of the imidazole compound to be used is preferably in a range of from 0.005 to 1 part by weight based on 100 parts by weight of the total amount of the aromatic hydroxycarboxylic acid, the aromatic dicarboxylic acid and the aromatic diol as the raw monomers for the liquid-crystalline polyester. In order to obtain a molded article having more satisfactory color tone, the amount of the imidazole compound to be used is more preferably in a range of from 0.05 to 0.5 part by weight. When the amount is too large, it becomes difficult to control the acylation reaction and the transesterification reaction. In contrast, when the amount is too small, melt fluidity of the liquid-crystalline polyester composition of the present invention is likely to be lowered, and the mechanical strength of the resultant molded article (electronic components) is likely to decrease. The imidazole compound may be added to a reactor together with the raw monomers before the acylation step, or the imidazole compound may be added to a reactor before the polymerization step and after the acylation step which was performed in the absence of the imidazole compound.

For the purpose of increasing the polymerization rate by further accelerating the transesterification reaction, other polymerization catalyst(s) may be further added as long as the objective of the present invention is not impaired. Examples of the other polymerization catalyst(s) as used herein include germanium compounds such as germanium oxide; tin compounds such as stannous oxalate, stannous acetate, dialkyltin oxide and diaryltin oxide; titanium compounds such as titanium dioxide, titanium alkoxide and alkoxytitanium silicates; antimony compounds such as antimony trioxide; metal salts of organic acid, such as sodium acetate, potassium acetate, calcium acetate, zinc acetate and ferrous acetate; Lewis acids such as boron trifluoride and aluminum chloride; amines; amides; and inorganic acids such as hydrochloric acid and sulfuric acid. When the liquid-crystalline polyester resin composition of the present invention is used for the production of electronic components such as connector, the smaller the amount of metal impurities contained in the liquid-crystalline polyester resin composition to be used, the better. Therefore, it is preferred that the polymerization catalyst containing metals, particularly the polymerization catalyst capable of generating free metal ions is used in a very small amount, or is not substantially used.

The acylation step and the polymerization step may be performed by a batch-wise reaction apparatus, or the acylation step and the polymerization step may be separately performed in different reactors using a continuous reaction apparatus.

Regarding the liquid-crystalline polyester thus obtained, the flow initiation temperature is preferably within a range of from 270 to 400° C., and more preferably within a range of from 280 to 380° C. When the liquid-crystalline polyester having the flow initiation temperature within the above range is used, soldering resistance of the resulting molded article (electronic components) obtained form the liquid-crystalline polyester composition of the present invention can be more improved. In melt molding for obtaining a molded article from the liquid-crystalline polyester resin composition, it is also possible to avoid a problem such as thermal deterioration of the liquid-crystalline polyester.

The flow initiation temperature as used herein means the temperature at which melt viscosity shows 4,800 Pa·s (48,000 poise) when a hot melt of a liquid-crystalline polyester is extruded through a nozzle at a rate of 4° C./minute under a load of 9.8 MPa (100 kg/cm$^2$) using a capillary rheometer with a nozzle measuring 1 mm in inner diameter and 10 mm in length, and is well-known to a person of ordinary skill in the art as a standard (indication) showing the molecular weight of the liquid-crystalline polymer (see, for example, "Liquid Crystal Polymer-Synthesis-Molding-Application" edited by Naoyuki Koide, pp 95-105, CMC, issued on Jun. 5, 1987).

The above liquid-crystalline polyester having suitable flow initiation temperature can be easily obtained by appropriately optimizing structural units constituting the liquid-crystalline polyester. Namely, when linearity of a molecular chain of the liquid-crystalline polyester is improved, the flow initiation temperature tends to increase. For example, in the structural units ($B_1$) and ($B_2$) among structural units derived from the aromatic dicarboxylic acid, since the structural unit ($B_1$) improves linearity of a liquid-crystalline polyester molecular chain and the structural unit ($B_2$) improves flexibility of a liquid-crystalline polyester molecular chain (causes deterioration of linearity), a liquid-crystalline polyester having a desired flow initiation temperature can be obtained by controlling a copolymerization ratio of ($B_1$) and ($B_2$).

When the molecular weight of the liquid-crystalline polyester is increased, the flow initiation temperature generally tends to increase. Thus, a liquid-crystalline polyester having a desired flow initiation temperature can be obtained by controlling the molecular weight. As described above, in order to increase the molecular weight of the liquid-crystalline polyester, it is preferred that solid phase polymerization is performed after performing melt polymerization including the above acylation and polymerization steps.

In the solid phase polymerization, first, the resin obtained by the melt polymerization is taken out and cooled, and then the cooled resin is crushed into powders or the powdered resin is granulated into pellets. The molecular weight of the liquid-crystalline polyester is increased by further heating the thus obtained resin in a solid state (in the form of powders or pellets). The method of increasing the molecular weight by further heating a resin in a solid state is called solid phase polymerization.

As the reaction conditions of the solid phase polymerization, for example, a method of heat-treating a resin in a solid state under an inert gas atmosphere or under reduced pressure for 1 to 20 hours is typically employed. The polymerization conditions of the solid phase polymerization can be appropriately optimized after determining the flow initiation temperature of the resin obtained by the melt polymerization. Examples of the apparatus used for the heat treatment include a known dryer, a reactor, an inert oven and an electric furnace.

In the present invention, a liquid-crystalline polyester mixture obtained by mixing a plurality of kinds of liquid-crystalline polyesters can also be used as a liquid-crystalline polyester contained in the liquid-crystalline polyester composition. When such a mixture is used, at least one kind of a liquid-crystalline polyester among a plurality of kinds of liquid-crystalline polyesters contained in the liquid-crystalline polyester mixture, is the liquid-crystalline polyester obtained by polymerizing materials comprising an aromatic hydroxycarboxylic acid in the presence of an imidazole compound. Preferably, all of liquid-crystalline polyesters in the mixture are the liquid-crystalline polyesters obtained by polymerizing materials comprising an aromatic hydroxycarboxylic acid in the presence of an imidazole compound.

Since warp of the resultant molded article, particularly wrap of the resulting elongated connector, can be sufficiently suppressed by further improving melt fluidity of the liquid-crystalline polyester resin composition of the present invention, it is preferred to use a liquid-crystalline polyester mixture containing two kinds of (that is, a plurality of) liquid-crystalline polyesters, each having a different flow initiation temperature from the other. In a combination of these liquid-crystalline polyesters, each having a different flow initiation temperature from the other, it is preferred that the flow initiation temperature of a first liquid-crystalline polyester having the highest flow initiation temperature (among the plurality of kinds of liquid-crystalline polyesters contained in the liquid-crystalline polyester mixture) is within a range of from 300 to 400° C. and that the flow initiation temperature of a second liquid-crystalline polyester having the lowest flow initiation temperature (among the plurality of kinds of liquid-crystalline polyesters contained in the liquid-crystalline polyester mixture) is within a range of from 260 to 350° C. It is more preferred that the flow initiation temperature of the first liquid-crystalline polyester is within a range of from 310 to 360° C. It is more preferred that the flow initiation temperature of the second liquid-crystalline polyester is within a range of from 270 to 320° C. In the liquid-crystalline polyester mixture provided in the combination of the liquid-crystalline polyesters described above, the amount of the second liquid-crystalline polyester to be used is preferably in a range of from 10 to 150 parts by weight, and more preferably in a range of from 60 to 100 parts by weight, based on 100 parts of the first liquid-crystalline polyester. Definition of the flow initiation temperatures of the first and the second liquid-crystalline polyesters is the same as described above.

When the flow initiation temperature of the first liquid-crystalline polyester is too low, the resulting molded article tends to have insufficient soldering resistance. In contrast, when the flow initiation temperature is too high, the efficiency tends to decrease when the liquid-crystalline polyester resin composition is subjected to melt molding, thus making it difficult to mold the liquid-crystalline polyester resin composition. When the flow initiation temperature of the second liquid-crystalline polyester is too low, the resulting molded article tends to have insufficient soldering resistance. In contrast, when the flow initiation temperature is too high, it also tends to become relatively difficult to mold the composition by melt molding.

The value obtained by subtracting the flow initiation temperature of the second liquid-crystalline polyester from the flow initiation temperature of the first liquid-crystalline polyester is preferably within a range of from 20 to 60° C. When this value (difference) is too small, melt fluidity of the liquid-crystalline polyester resin mixture itself is likely to be lowered, resulting in insufficient melt fluidity of the liquid-crystalline polyester resin composition. In contrast, when this value (difference) is too large, the second liquid-crystalline polyester is likely to deteriorate upon molding.

As suitable combination of structural units constituting the first liquid-crystalline polyester, the Combinations (a) and (b) are preferred, and the Combination (a) is more preferred, as described above. Regarding the Combination (a), a molar ratio of ($C_1$) to ($A_1$) (that is, a molar ratio ($C_1$)/($A_1$)) is preferably in a range of from 0.2 to 1, a molar ratio of ($B_1$) and ($B_2$) to ($C_1$) (that is, a molar ratio (($B_1$)+($B_2$))/($C_1$)) is preferably in a ratio of from 0.9 to 1.1, and a molar ratio of ($B_2$) to ($B_1$) (that is, a molar ratio ($B_2$)/($B_1$)) is preferably more than 0, but 1 or less.

The liquid-crystalline polyester, which satisfies the combination of these structural units and the molar ratio and is obtained by polymerization of the corresponding raw monomers, can make melt fluidity of the liquid-crystalline polyester resin composition of the present invention more satisfactory, and also make soldering resistance and impact resistance of the resultant molded article satisfactory.

As suitable combination of structural units constituting the second liquid-crystalline polyester, the Combinations (a) and (b) are preferred, and the Combination (a) is more preferred, as described above. Regarding the Combination (a), a molar ratio of ($C_1$) to ($A_1$) (that is, a molar ratio ($C_1$)/($A_1$)) is preferably in a range of from 0.2 to 1.0, a molar ratio of ($B_1$) and ($B_2$) to ($C_1$) (that is, a molar ratio (($B_1$)+($B_2$))/($C_1$)) is preferably in a range of from 0.9 to 1.1, and a molar ratio of ($B_2$) to ($B_1$) (that is, a molar ratio ($B_2$)/($B_1$)) is preferably more than 0, but 1 or less. Since the kinds of structural units constituting the second liquid-crystalline polyester are the same as those of suitable first liquid-crystalline polyester, when two kinds of these liquid-crystalline polyesters are mixed, compatibility of the first and the second liquid-crystalline polyesters tends to become extremely satisfactory. The kinds of structural units constituting the first and second liquid-crystalline polyesters and the molar ratio are appropriately selected so as to satisfy the flow initiation temperatures of the first and the second liquid-crystalline polyesters.

By adjusting the molar ratio of the structure units of monomers for a liquid-crystalline polyester, the resulting liquid-crystalline polyester can be controlled in linearity of a molecular chain of the liquid-crystalline polyester. Since the mixture of liquid-crystalline polyesters, each having a different flow initiation temperature, can be produced by controlling linearity of a molecular chain of the liquid-crystalline polyesters as described above, it is preferred to optimize a copolymerization ratio of ($B_1$) to ($B_2$). Specifically, when a molar ratio ($B_2$)/($B_1$) of the first liquid-crystalline polyester ratio is defined as "α" and a molar ratio ($B_2$)/($B_1$) of the second liquid-crystalline polyester ratio is defined as "β", a ratio of the former to the latter (that is, α/β) is preferably within a range of from 0.1 to 0.6, and more preferably within a range of from 0.3 to 0.6.

While the liquid-crystalline polyester mixture containing not only the first and second liquid-crystalline polyesters but also other liquid-crystalline polyester(s) can be used in the liquid-crystalline polyester composition of the present invention, a liquid-crystalline polyester mixture composed substantially of the first and second liquid-crystalline polyesters is preferably used.

A mica used in the present invention is an aluminosilicate containing an alkali metal and comprises a muscovite. The mica may contain the muscovite in the amount of 50% by weight, more preferably 80% by weight, based on the mica. The mica may consist essentially of a muscovite.

The volume average particle diameter of the mica used in the present invention is 40 μm or less, and preferably 25 μm or less. The volume average particle diameter as used herein is the value which can be measured by a laser diffraction particle size distribution analyzer. The mica having such a volume average particle diameter has satisfactory miscibility with the liquid crystal polyester used in the present invention and can make melt fluidity of the resulting liquid-crystalline polyester resin composition of the present invention more satisfactory.

The mica used in the present invention has a specific surface area of 6 $m^2$/g or less. The specific surface area is preferably 4 $m^2$/g or less. The specific surface area as used herein can be determined by the measurement of a BET specific surface area. When the mica having a specific surface area of more than 6 $m^2$/g is used, hydrolysis of the liquid-crystalline polyester used together with the mica in a liquid-crystalline polyester resin composition may be promoted in the case where the liquid-crystalline polyester resin composition is subjected to melt molding under comparatively high temperature conditions. When hydrolysis of the liquid-crystalline polyester occurs, soldering resistance of the resultant molded article is likely to deteriorate, unfavorably. Since the specific surface area of mica tends to decrease as the volume average particle diameter of mica increases, it is preferred to select a mica having a suitable volume average particle diameter so as to satisfy suitable specific surface area.

As described above, the mica used in the present invention comprises a muscovite. While many kinds of mica are known, it is said that mica composed of muscovite ($K_2O.3Al_2O_3.6SiO_2.2H_2O$) or phlogopite ($K_2O.6MgO.Al_2O_3.6SiO_2.2H_2O$) are mainly utilized in the present technical field. The present inventors have found that, when phlogopite is used as mica with the liquid-crystalline polyester to provide the composition thereof and the composition is molded into an elongated connector having a thick-wall portion, it is not easy to sufficiently suppress the occurrence of warp of the elongated connector, even if the mica has a volume average particle diameter of 40 μm or less and a specific surface area of 6 $m^2$/g or less. The present inventors have also found that melt fluidity of such a liquid-crystalline polyester resin composition is likely to deteriorate as a result of the use of phlogopite.

While a method for producing a liquid-crystalline polyester resin composition of the present invention is not limited, it is preferred to produce the composition by the method of melt-mixing a liquid-crystalline polyester with a mice. Specifically, it is preferred to produce the liquid-crystalline polyester composition by the method which comprises the steps of:

polymerizing monomers comprising an aromatic hydroxycarboxylic acid in the presence of an imidazole compound to prepare a liquid-crystalline polyester; and melt-mixing the liquid-crystalline polyester with a mica which comprises a muscovite and has a volume average particle diameter of 40 μm or less and a specific surface area of 6 $m^2$/g or less, the amount of the mica being 15 to 100 parts by weight based on 100 parts by weight of the liquid-crystalline polyester.

When the liquid-crystalline polyester composition is produced by the method of the melt-mixing described above, especially when the composition is produced by the method of melt-mixing and is made into pellets, the amount of adherent water contained in the mica before the melt-mixing is preferably 0.3% by weight or less, and more preferably 0.2% by weight or less, based on the mica. The amount of adherent water of mica as used herein is the value which can be measured by a heat-dry type moisture meter. When the amount of adherent water in the mica is too large, hydrolysis of the liquid-crystalline polyester used together with the mica in a liquid-crystalline polyester resin composition may be promoted by an influence of adherent water in the case where the liquid-crystalline polyester resin composition is melt-mixed under comparatively high temperature conditions to obtain pellets of the composition. It becomes possible to decrease the amount of adherent water by controlling the specific surface area of mica to 6 $m^2$/g or less.

<Other Components>

The liquid-crystalline polyester resin composition of the present invention can also contain fillers and additives other than the mica to be used in the present invention. In view of mechanical strength of the resultant molded article, the liquid-crystalline polyester resin composition preferably contains such fillers and additives. The filler is preferably a fibrous filler, and more preferably a fibrous filler made of an inorganic material (that is, a fibrous inorganic filler).

The fibrous inorganic filler preferably has an average fiber diameter of from 0.1 to 20 μm, and more preferably has an average fiber diameter of from 0.5 to 15 μm. When the average fiber diameter is too small, it may become difficult to attain the effects (such as decrease in warp of the resultant molded article) of the present invention. In contrast, when the average fiber diameter is too large, melt fluidity of the liquid-crystalline polyester resin composition containing such fibrous inorganic filler tends to deteriorate. The fibrous inorganic filler preferably has an average fiber length of from 1 to 300 μm, and more preferably has an average fiber length of from 5 to 300 μm. When the average fiber length is too small, sufficient improvement in the mechanical strength of the resultant molded article may be difficult to attain. In contrast, when the average fiber length is too large, melt fluidity of the liquid-crystalline polyester resin composition containing such fibers tends to deteriorate.

Examples of the fibrous inorganic filler include glass fiber, wollastonite, aluminum borate whisker, potassium titanate whisker, silica alumina fiber and alumina fiber. Among these, glass fiber, carbon fiber, wollastonite, aluminum borate whisker and potassium titanate whisker are preferred. When the fibrous inorganic filler is used, they may be used alone, or two or more kinds of them may also be used.

Examples of additives which can be included in the liquid-crystalline polyester resin composition of the present invention include resins other than the liquid-crystalline polyester; and additives which are well-known in the present technical field. Examples of the resins other than the liquid-crystalline polyester include thermoplastic resins such as polyamide, polyester, polyphenylene sulfide, polyetherketone, polycarbonate, polyphenylene ether and modified compound thereof, polysulfone, polyether sulfone, and polyether imide; and thermocurable resins such as phenol resin, epoxy resin and polyimide resin. Examples of the additives well-known in the present technical field include release modifiers such as metal soaps; colorants such as dyes and pigments; antioxidants; heat stabilizers; ultraviolet absorbers; antistatic agents; and surfactants. Also, additives having external lubricant effect such as higher fatty acids, higher fatty acid esters, higher fatty acid metal salts and fluorocarbon-based surfactants can be contained in the liquid-crystalline polyester resin composition of the present invention.

The kinds and amounts of the fibrous inorganic filler and the additives can be appropriately determined so as not to extremely impair excellent melt fluidity of the liquid-crystalline polyester resin composition of the present invention.

As described above, the liquid-crystalline polyester resin composition of the present invention contains the mica and the liquid-crystalline polyester, and the amount of mica to be contained is in a range of from 15 to 100 parts by weight, preferably in a range of from 25 to 80 parts by weight, more preferably in a range of from 30 to 50 parts by weight, based on 100 parts by weight of the liquid-crystalline polyester. When the amount of mica is 15 parts by weight or more, the occurrence of warp of the resultant molded article (particularly an elongated connector) is sufficiently suppressed. When the amount of mica is 100 parts by weight or less, melt fluidity of the resultant liquid-crystalline polyester resin composition upon melt molding becomes satisfactory, which results in easiness in molding. An molded article (especially, an elongated connector) obtained from the liquid-crystalline polyester resin composition of the present invention, which contains the mica in the amount within the range described above, has satisfactory heat resistance, which is advantageous when a molding article having practical soldering resistance is required. When the liquid-crystalline polyester mixture is used as the liquid-crystalline polyester inn the present invention, the mica may be mixed in an amount of from 15 to 100 parts by weight, and preferably in an amount of from 25 to 80 parts by weight, based on 100 parts by weight of the liquid-crystalline polyester mixture.

Examples of method of mixing raw components with the liquid-crystalline polyester for obtaining the liquid-crystalline polyester resin composition of the present invention include a method of separately feeding a liquid-crystalline polyester, a mica, and optional fibrous fillers and additives into a melt mixer, followed by mixing these components; and a method of preliminarily mixing these components using a mortar, a Henschel mixer, a ball mill, a ribbon blender or the like, and then feeding the resulting mixture into a melt mixer, followed by mixing them again.

As described above, the amount of adherent water of the mica before feeding to the melt mixer is preferably 0.3% by weight or less based on the mica.

A molded article, particularly an elongated connector can be suitably obtained, for example, by melt molding of the liquid-crystalline polyester resin composition thus obtained. The molding method is preferably an injection molding method. The molding temperature of injection molding can be appropriately determined taking into account a flow initiation temperature (Tr[° C.]) of the liquid-crystalline polyester contained in the liquid-crystalline polyester resin composition. Specifically, the molding temperature is preferably set higher than Tr° C. of the liquid-crystalline polyester resin by 10 to 80° C. When the molding is conducted at a temperature within the above range, the liquid-crystalline polyester resin composition easily exhibits excellent melt fluidity and, satisfactory moldability can be fully exhibited even in the production of a connector having an ultra-thin wall portion or a connector having a complicated shape. Also, when the molding is conducted at a temperature within the above range, characteristics such as soldering resistance and mechanical strength of the connector obtained under such a melt molding condition may not deteriorate, since deterioration of the liquid-crystalline polyester in the melt molding is sufficiently prevented. Particularly, even when the liquid-crystalline polyester resin composition is molded into a connector having a thin wall section (wall thickness: 0.1 mm or less), it becomes possible to sufficiently suppress the occurrence of warp. The thus obtained connector is also excellent in mechanical strength such as Izod impact strength (impact resistance) and bending modulus without deterioration of excellent heat resistance of the liquid-crystalline polyester. Therefore, it is possible to easily obtain a connector which will probably be required to have thinning and complexity of its shape in future. Such a connector having a thin-wall portion and a complicated shape is suitable for electronic components used in mobile devices.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2008-331141 filed on Dec. 25, 2008, indicating specification, claims, summary and figures, are incorporated herein by reference in their entirety.

EXAMPLES

The present invention is described in more detail by following Examples, which should not be construed as a limitation upon the scope of the present invention.

Physical properties of mica were measured by methods (1) to (3) shown below, and the resultant liquid-crystalline polyester resin compositions were evaluated by methods (4) to (6).

(1) Volume Average Particle Diameter

The volume average particle diameter was measured by a master sizer (SYSMEX CORPORATION).

(2) Specific Surface Area

The specific surface area was measured by Hmmodel-1208 (Mountech).

(3) Adherent Water

The amount of adherent water was measured by a heat-dry type moisture meter (A&D Company, Limited)

(4) Thin-Wall Flow Length (Melt Fluidity)

Figure 2:
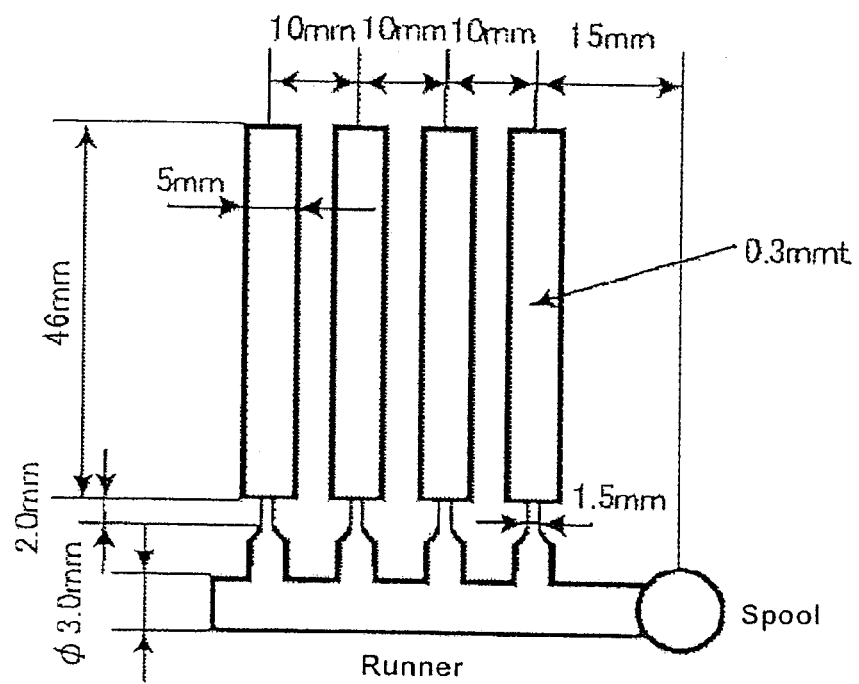
FIG. 2 is a view schematically showing a mold used for evaluation of a thin-wall flow length of Examples.

A liquid-crystalline polyester resin composition was molded at a cylinder temperature of 350° C., a mold temperature of 130° C. and an injection rate of 60% using an injection molding machine ("PS10E1ASE" manufactured by Nissei Plastic Industrial Co., Ltd.) equipped with a mold (0.3 mmt) shown in FIG. 2. The lengths of four cavity portions were measured and a measured value of five molded articles was taken as a thin-wall flow length.

(5) Soldering Resistance

A liquid-crystalline polyester resin composition was molded at a cylinder temperature of 350° C., a mold temperature of 130° C. and an injection rate of 60% using an injection molding machine ("PS40E1ASE" manufactured by Nissei Plastic Industrial Co., Ltd.) to obtain JIS K7113 (½) dumbbell specimens (thickness: 1.2 mm). Ten specimens thus obtained were immersed in a solder bath heated at 280° C. for 60 seconds and, after taking out the specimens, it was observed whether blister was generated on a surface of each specimen or not. The blister generation probability (%) was calculated from the number of the specimens in which blister occurred.

(6) Warp

A liquid-crystalline polyester resin composition was molded using an injection molding machine ("ES400" manufactured by Nissei Plastic Industrial Co., Ltd.) to obtain a connector shown in FIG. 1. Injection molding was performed under the conditions of a cylinder temperature of 350° C., a mold temperature of 70° C. and an injection rate of 150 mm/second. With respect to a bottom of the resulting connector, the amount of warp was measured every 0.2 mm in a length direction and measured every 0.5 mm in a width direction using a flatness measuring module (Cores Co., Ltd.) and an average was calculated and was taken as an amount of warp before reflow. Furthermore, the same connector was allowed to stand at 50° C. for 40 seconds, heated to 270° C., allowed to stand at the same temperature for 1 minute and cooled to 50° C. In the same manner as described above, the amount of warp was measured and an average was calculated and was taken as an amount of warp after reflow. The connector is a connector for 53 pin (0.3 mm pitch) FPV, measuring 18 m in length, 3.5 mm in width and 1 mm in length, and has a minimum thick-wall portion of 0.1 mm.

Production Example 1

In a reactor equipped with a stirrer, a torque meter, a nitrogen gas introducing tube, a thermometer and a reflux condenser, 994.5 g (7.2 mol) of parahydroxybenzoic acid, 299.0 g (1.8 mol) of terephthalic acid, 99.7 g (0.6 mol) of isophthalic acid, 446.9 g (2.4 mol) of 4,4'-dihydroxybiphenyl and 1347.6 g (13.2 mol) of acetic anhydride were charged. After the atmosphere in the reactor was sufficiently replaced by nitrogen gas, 0.18 g of 1-methylimidazole was added. The temperature was raised to 150° C. under a nitrogen gas flow over 30 minutes and the mixture was refluxed for 30 minutes by maintaining at the same temperature. After adding 2.4 g of 1-methylimidazole, the temperature was raised to 320° C. over 2 hours and 50 minutes while distilling off acetic acid distilled as by-products and the unreacted acetic anhydride. The time at which an increase in torque was recognized was regarded as completion of the reaction, and a prepolymer was taken out. The resultant prepolymer was cooled to room temperature and then crushed by a coarse crusher. The crushed prepolymer was subjected to solid phase polymerization by heating from room temperature to 250° C. under a nitrogen atmosphere over 1 hour, heating from 250° C. to 295° C. over 5 hours and maintaining at 295° C. for 3 hours. The liquid-crystalline polyester thus obtained is referred to as LCP1. The resulting LCP1 showed a flow initiation temperature of 327° C., a molar ratio $(C_1)/(A_1)$ of 1/3, a molar ratio $((B_1)+(B_2))/C_1$ of 1/1, and a molar ratio $(B_2)/(B_1)$ of 1/3.

Production Example 2

In the same manner as in Production Example 1, except that 1-methylimidazole was not added, a prepolymer was obtained. The resultant prepolymer was crushed by a coarse crusher and then subjected to solid phase polymerization by heating from room temperature to 250° C. under a nitrogen atmosphere over 1 hour, heating from 250° C. to 285° C. over 5 hours and maintaining at 285° C. for 3 hours. The liquid-crystalline polyester thus obtained is referred to as LCP2. The resulting LCP2 showed a flow initiation temperature of 324° C., a molar ratio $(C_1)/(A_1)$ of 1/3, a molar ratio $((B_1)+(B_2))/C_1$ of 1/1, and a molar ratio $(B_2)/(B_1)$ of 1/3.

Production Example 3

In a reactor equipped with a stirrer, a torque meter, a nitrogen gas introducing tube, a thermometer and a reflux condenser, 994.5 g (7.2 mol) of parahydroxybenzoic acid, 239.2 g (1.44 mol) of terephthalic acid, 159.5 g (0.96 mol) of isophthalic acid, 4,4'-dihydroxybiphenyl 446.9 g (2.4 mol) and 1347.6 g (13.2 mol) of acetic anhydride were charged. After the atmosphere in the reactor was sufficiently replaced by nitrogen gas, 0.18 g of 1-methylimidazole was added. The temperature was raised to 150° C. under a nitrogen gas flow over 30 minutes and the mixture was refluxed for 30 minutes by maintaining at the same temperature. After adding 2.4 g of 1-methylimidazole, the temperature was raised to 320° C. over 2 hours and 50 minutes while distilling off acetic acid distilled as by-products and the unreacted acetic anhydride. The time at which an increase in torque was recognized was regarded as completion of the reaction, and a prepolymer was taken out. The resultant prepolymer was cooled to room temperature and then crushed by a coarse crusher. The crushed prepolymer was subjected to solid phase polymerization by heating from room temperature to 220° C. under a nitrogen atmosphere over 1 hour, heating from 220° C. to 240° C. over 0.5 hours and maintaining at 240° C. for 10 hours. The liquid-crystalline polyester thus obtained is referred to as LCP3. The resulting LCP3 showed a flow initiation temperature of 286° C., a molar ratio $(C_1)/(A_1)$ of 1/3, a molar ratio $((B_1)+(B_2))/C_1$ of 1/1, and a molar ratio $(B_2)/(B_1)$ of 2/3.

Production Example 4

In the same manner as in Production Example 3, except that 1-methylimidazole was not added, a prepolymer was obtained. The resultant prepolymer was crushed by a coarse crusher and then subjected to solid phase polymerization by heating from room temperature to 220° C. under a nitrogen atmosphere over 1 hour, heating from 220° C. to 245° C. over 0.5 hours and maintaining at 245° C. for 10 hours. The liquid-crystalline polyester thus obtained is referred to as LCP4. The resulting LCP4 showed a flow initiation temperature of 285° C., a molar ratio $(C_1)/(A_1)$ of 1/3, a molar ratio $((B_1)+(B_2))/C_1$ of 1/1, and a molar ratio $(B_2)/(B_1)$ of 2/3.

Micas shown below were used. The kind and measurement results of physical properties of mica obtained by the methods (1) to (3) described above are shown in Table 1.

"AB-25S" manufactured by YAMAGUCHI MICA CO., LTD.

"A61" manufactured by YAMAGUCHI MICA CO., LTD.

TABLE 1

| Product name | Kind | Volume average particle diameter (μm) | Specific surface area (m²/g) | Adherent water (%) |
|---|---|---|---|---|
| AB25S | Muscovite | 21 | 4 | 0.19 |
| A61 | Muscovite | 47 | 4 | 0.18 |
| A21 | Muscovite | 19 | 11 | 0.50 |
| 300W | Muscovite | 32 | 9 | 0.39 |
| 325HK | Phlogopite | 27 | 4 | 0.27 |
| 300WM | Muscovite | 32 | 4 | 0.16 |

TABLE 2

| Example | Liquid-crystalline polyester Kind | Parts by weight | Mica Product name | Parts by weight | Thin-wall flow length (mm) | Soldering resistance Blister generation probability (%) | Amount of warp after reflow (mm) |
|---|---|---|---|---|---|---|---|
| Example 1 | LCP1 | 100 | AB25S | 33 | 31 | 0 | 0.080 |
| Comparative Example 1 | LCP2 | 100 | AB25S | 33 | 28 | 60 | 0.110 |
| Example 2 | LCP1/LCP3 | 55/45 | AB25S | 33 | 37 | 0 | 0.033 |
| Example 3 | LCP1/LCP3 | 55/45 | AB25S | 43 | 31 | 0 | 0.021 |
| Example 4 | LCP1/LCP3 | 55/45 | 300WM | 33 | 36 | 0 | 0.039 |
| Comparative Example 2 | LCP2/LCP4 | 55/45 | AB25S | 33 | 35 | 40 | 0.090 |
| Comparative Example 3 | LCP1/LCP3 | 55/45 | A61 | 33 | 34 | 0 | 0.100 |
| Comparative Example 4 | LCP1/LCP3 | 55/45 | A21 | 33 | 40 | 80 | 0.060 |
| Comparative Example 5 | LCP1/LCP3 | 55/45 | 300W | 33 | 36 | 100 | 0.039 |
| Comparative Example 6 | LCP1/LCP3 | 55/45 | 325HK | 33 | 30 | 100 | 0.087 |
| Comparative Example 7 | LCP1/LCP3 | 55/45 | (talc/glass fibers) | 50/17 | 22 | 0 | 0.083 |

"A21" manufactured by YAMAGUCHI MICA CO., LTD.

"300W" manufactured by Kuraray trading Co., Ltd.

"325 KH" manufactured by Kuraray trading Co., Ltd.

Examples 1 to 3 and Comparative Examples 1 to 6

The liquid-crystalline polyesters and micas shown in Table 2 were mixed in the amounts shown in Table 2, and the resulting mixtures were granulated at a cylinder temperature of 340° C. using a twin screw extruder ("PCM-30HS", Ikegai Iron Works, Ltd.) and a water sealed vacuum pump ("SW-25", Shinko Seiki Co., Ltd.), while de-airing through a vacuum vent to obtain liquid-crystalline polyester resin compositions in the form of pellets. The results of evaluations (4) to (6) of the resultant liquid-crystalline polyester resin compositions are shown in Table 2.

Example 4

The liquid-crystalline polyester LCP1/LCP3 and mica 300WM shown in Table 2 are mixed in the amounts shown in Table 2, and the resulting mixture is granulated in the same manner as in Examples 1 to 3 to obtain a liquid-crystalline polyester resin composition in the form of pellets. The results of evaluations (4) to (6) of the resultant liquid-crystalline polyester resin compositions are shown in Table 2.

Comparative Example 7

A liquid-crystalline polyester resin composition and pellets thereof were obtained in the same manner as in Example 1 except that 50 parts by weight of a talc (having a volume average particle diameter of 16 μm, a specific surface area of 2.11 m²/g and an adherent water of 0.13%) and 17 parts by weight of glass fibers (having a specific surface area of 0.38 m²/g and an adherent water of 0.11%) were used instead of using the mica AB25S. The results of evaluations (4) to (6) of the resultant liquid-crystalline polyester resin composition are shown in Table 2.

What is claimed is:

1. A liquid-crystalline polyester resin composition comprising a liquid-crystalline polyester obtained by polymerizing monomers comprising an aromatic hydroxycarboxylic acid in the presence of an imidazole compound, and a mica which comprises a muscovite and has a volume average particle diameter of 40 μm or less and a specific surface area of 6 m²/g or less, the amount of the mica being 15 to 100 parts by weight based on 100 pats by weight of the liquid-crystalline polyester.

2. The liquid-crystalline polyester resin composition according to claim 1, wherein the imidazole compound is a compound represented by the following formula (1):

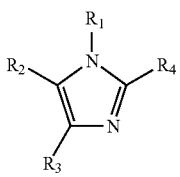

wherein R₁ to R₄ each represent a hydrogen atom, an alkyl group having 1 to 4 carbon atoms, a hydroxymethyl group, a cyano group, a cyanoalkyl group having 2 to 5 carbon atoms, a cyanoalkoxy group having 2 to 5 carbon atoms, a carboxyl group, an amino group, an aminoalkyl group having 1 to 4 carbon atoms, an aminoalkoxyl group having 1 to 4 carbon atoms, a phenyl group, a benzyl group, a phenylpropyl group or a formyl group, and may be the same or different from one another.

3. The liquid-crystalline polyester resin composition according to claim 1, wherein the liquid-crystalline polyester is a liquid-crystalline polyester obtained by a method comprising the steps of:
acylating a phenolic hydroxyl group of an aromatic hydroxycarboxylic acid and a phenolic hydroxyl group of an aromatic diol with a fatty acid anhydride to obtain an acylated aromatic hydroxycarboxylic acid and an acylated aromatic diol; and
polymerizing the acylated aromatic hydroxycarboxylic acid, an aromatic dicarboxylic acid and the acylated aromatic diol in the presence of an imidazole compound thorough transesterification to obtain a liquid-crystalline polyester.

4. The liquid-crystalline polyester resin composition according to claim 3, wherein the aromatic hydroxycarboxylic acid is parahydroxybenzoic acid; the aromatic dicarboxylic acid is terephthalic acid and/or isophthalic acid; and the aromatic diol is 4,4'-dihydroxybiphenyl.

5. The liquid-crystalline polyester resin composition according to claim 1, wherein the liquid-crystalline polyester has a flow initiation temperature of from 270 to 400° C.

6. The liquid-crystalline polyester resin composition according to claim 1, wherein the liquid-crystalline polyester is a liquid-crystalline polyester mixture containing a plurality of liquid-crystalline polyesters, the flow initiation temperature of a first liquid-crystalline polyester having the highest flow initiation temperature among the plurality of liquid-crystalline polyesters is within a range of from 300 to 400° C., the flow initiation temperature of a second liquid-crystalline polyester having the lowest flow initiation temperature among the plurality of liquid-crystalline polyesters is within a range of from 260 to 350° C., and the liquid-crystalline polyester mixture contains the second liquid-crystalline polyester in an amount of from 10 to 150 parts by weight based on 100 parts by weight of the first liquid-crystalline polyester.

7. The liquid-crystalline polyester resin composition according to claim 6, wherein the value obtained by subtracting the flow initiation temperature of the second liquid-crystalline polyester from the flow initiation temperature of the first liquid-crystalline polyester is within a range of from 20 to 60° C.

8. A connector obtained by molding the liquid-crystalline polyester resin composition according to claim 1.

9. The connector according to claim 8, which has a thin-wall portion having a wall thickness of 0.1 mm or less.

10. A method for producing a liquid-crystalline polyester resin composition, which comprises the steps of:
polymerizing monomers comprising an aromatic hydroxycarboxylic acid in the presence of an imidazole compound to prepare a liquid-crystalline polyester; and
melt-mixing the liquid-crystalline polyester with a mica which comprises a muscovite and has a volume average particle diameter of 40 μm or less and a specific surface area of 6 m²/g or less, the amount of the mica being 15 to 100 parts by weight based on 100 pats by weight of the liquid-crystalline polyester.

11. The method according to claim 10, wherein the imidazole compound is a compound represented by the following formula (1):

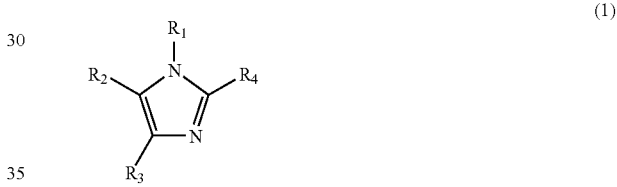

wherein R₁ to R₄ each represent a hydrogen atom, an alkyl group having 1 to 4 carbon atoms, a hydroxymethyl group, a cyano group, a cyanoalkyl group having 2 to 5 carbon atoms, a cyanoalkoxy group having 2 to 5 carbon atoms, a carboxyl group, an amino group, an aminoalkyl group having 1 to 4 carbon atoms, an aminoalkoxyl group having 1 to 4 carbon atoms, a phenyl group, a benzyl group, a phenylpropyl group or a formyl group, and may be the same or different from one another.

12. The method according to claim 10, wherein the mica contains adherent water in the amount of 0.3% by weight or less based on the mica.

13. The liquid-crystalline polyester resin composition according to claim 1, wherein the mica is a mica consisting essentially of a muscovite.

\* \* \* \* \*